United States Patent
Lorenzo et al.

(10) Patent No.: US 11,036,939 B2
(45) Date of Patent: Jun. 15, 2021

(54) DATA DRIVEN APPROACH FOR AUTOMATICALLY GENERATING A NATURAL LANGUAGE PROCESSING CARTRIDGE

(71) Applicant: INTERNATIONAL BUSINESS MACHINES CORPORATION, Armonk, NY (US)

(72) Inventors: Mario J. Lorenzo, Miami, FL (US); Jennifer Lynn La Rocca, Cary, NC (US); Rebecca Lynn Dahlman, Rochester, MN (US); Kristin E. McNeil, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 16/381,948

(22) Filed: Apr. 11, 2019

(65) Prior Publication Data
US 2020/0327195 A1    Oct. 15, 2020

(51) Int. Cl.
| | | |
|---|---|---|
| *G06F 40/295* | (2020.01) | |
| *G06F 40/30* | (2020.01) | |
| *G06N 20/00* | (2019.01) | |
| *G06N 5/02* | (2006.01) | |
| *G06F 40/242* | (2020.01) | |

(52) U.S. Cl.
CPC ............ *G06F 40/30* (2020.01); *G06F 40/242* (2020.01); *G06F 40/295* (2020.01); *G06N 5/02* (2013.01); *G06N 20/00* (2019.01)

(58) Field of Classification Search
CPC ........ G06F 40/30; G06F 8/658; G06F 40/295; G06F 40/35
USPC .......................................................... 704/9
See application file for complete search history.

(56) References Cited

U.S. PATENT DOCUMENTS

| | | | |
|---|---|---|---|
| 9,269,273 B1 * | 2/2016 | Rose Charvet | G06F 16/93 |
| 9,686,275 B2 * | 6/2017 | Chari | H04L 63/0861 |
| 9,858,261 B2 | 1/2018 | Fan et al. | |
| 9,886,525 B1 | 2/2018 | Soman et al. | |
| 10,055,410 B1 * | 8/2018 | Dubbels | G06F 16/9024 |
| 10,133,734 B2 * | 11/2018 | Rose Charvet | G06N 7/005 |
| 10,268,688 B2 * | 4/2019 | Dubbels | G06F 16/9024 |
| 10,599,885 B2 * | 3/2020 | Galitsky | G06F 40/216 |
| 10,607,736 B2 * | 3/2020 | Eggebraaten | G16H 50/70 |
| 10,699,109 B2 * | 6/2020 | Kalyuzhny | G06K 9/00442 |
| 2016/0292157 A1 | 10/2016 | Zhang et al. | |
| 2017/0351689 A1 | 12/2017 | Vasudevan et al. | |
| 2018/0068076 A1 | 3/2018 | Farri et al. | |

(Continued)

OTHER PUBLICATIONS

Ronen Feldman, et al., "Knowledge Discovery in Textual Databases (KDT)," KDD, vol. 95, pp. 112-117. 1995.

(Continued)

*Primary Examiner* — Susan I McFadden
(74) *Attorney, Agent, or Firm* — Konrad Raynes Davda & Victor LLP; Rabindranath Dutta

(57) ABSTRACT

An artifact identification engine identifies artifacts from structured and unstructured data in one or more documents based on pre-defined artifacts, by using cognitive annotations. The identified artifacts are analyzed based at least on received inputs. A cartridge that includes artifacts that are relevant to the structured and unstructured data is generated, based on the analyzing.

18 Claims, 8 Drawing Sheets

(56) References Cited

U.S. PATENT DOCUMENTS

2018/0158552 A1 6/2018 Liu et al.
2020/0278860 A1* 9/2020 Lorenzo .................. G06F 8/658

OTHER PUBLICATIONS

Graciela H. Gonzalez, et al., "Recent Advances and Emerging Applications in Text and Data Mining for Biomedical Discovery," Briefings in Bioinformatics, vol. 17, Issue 1, Jan. 1, 2016, pp. 33-42.

* cited by examiner

DATA DRIVEN APPROACH FOR AUTOMATICALLY GENERATING A NATURAL LANGUAGE PROCESSING CARTRIDGE

BACKGROUND

1. Field

Embodiments relate to a data driven approach for automatically generating a natural language processing cartridge.

2. Background

Data analytics is the process of examining data sets in order to draw conclusions about the information they contain, increasingly with the aid of specialized systems and software. In data analytics, the identification and extraction of significant concepts from document collections may be performed by specialized software that is referred to as natural language processing software. Natural language processing software may analyze text to extract metadata from content, such as concepts, entities, keywords, categories, sentiment, emotion, relations, and semantic roles using natural language understanding.

In data analytics, cartridges may contain analytic logic based on different technologies ranging from simple regular expressions to cognitive approaches like natural language processing. Cartridges may enable the detection of additional information in documents. Cartridges may include rules for natural language processing or other code for analyzing document content and to detect the new data in documents during indexing and make these new insights searchable. For example, a sensitive pattern cartridge may enable a data analytics software to detect passport numbers, phone numbers, and other identifiers.

SUMMARY OF THE PREFERRED EMBODIMENTS

Provided a method, system, and computer program product in which an artifact identification engine identifies artifacts from structured and unstructured data in a one or more documents based on pre-defined artifacts, by using cognitive annotations. The identified artifacts are analyzed based at least on received inputs. A cartridge that includes artifacts that are relevant to the structured and unstructured data is generated, based on the analyzing.

In further embodiments, a cognitive model of the one or more documents is generated from the cartridge.

In certain embodiments, the identified artifacts exceed a frequency threshold of occurrence in the one or more documents.

In additional embodiments, the received inputs include a predetermined threshold in matching for entities within an artifact, wherein if entities within an identified artifact exceed the predetermined threshold in matching, then the identified artifact is added to the cartridge, and wherein the cartridge generates a cognitive model for the one or more documents.

In certain embodiments, the received inputs include a predetermined threshold in matching for entities within an artifact, wherein if entities within the identified artifact do not exceed the predetermined threshold in matching, then a subset of the entities of the identified artifact is added to the cartridge, and wherein the cartridge generates a cognitive model for the one or more documents.

In further embodiments, the received inputs are used to generate filter artifacts based on concepts that are identified as not interesting in the received inputs.

In yet further embodiments, the cognitive annotations are generated via a natural language processing software that process the structured and unstructured data in the one or more documents based on the pre-defined artifacts.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The cognitive field and its concepts are relatively new for users and many users do not have experience in envisioning and building new cognitive models. As a result, many users may want to embark on a cognitive solution but they do not know the concepts and terms that exist in their unstructured data nor do they have a clear vision of how to build their data models.

Additionally, there are many artifacts already pre-built and many users within an organization may not know this information at a detailed level. They may be aware of a pre-built dictionary but they may not know the detailed concepts within the dictionary or how well it will apply to their data. Such users need a system to help them auto-generate a cognitive model that reuses existing artifacts that are relevant to their data. This generated model may be used as a starting point where the user may build up a use case for a specific cognitive model. The auto-generated model provides a quick start mechanism and helps reduce development costs of building a model for cognitive solutions.

Certain embodiments provide a mechanism to auto-generate a base cognitive model based on a provided data set and a collection of reusable knowledge artifacts. Such embodiments utilize text analytics (machine learning or rules based) with pre-built artifacts (dictionaries, attributes, rules, deep learning network) to analyze a corpus of documents. A list of artifacts that are matched within the corpus of data is identified. If these artifacts meet certain thresholds then they are added to a new cartridge. This auto generated cartridge becomes a starting point for users to build their cognitive model.

Exemplary Embodiments

Figure 1:
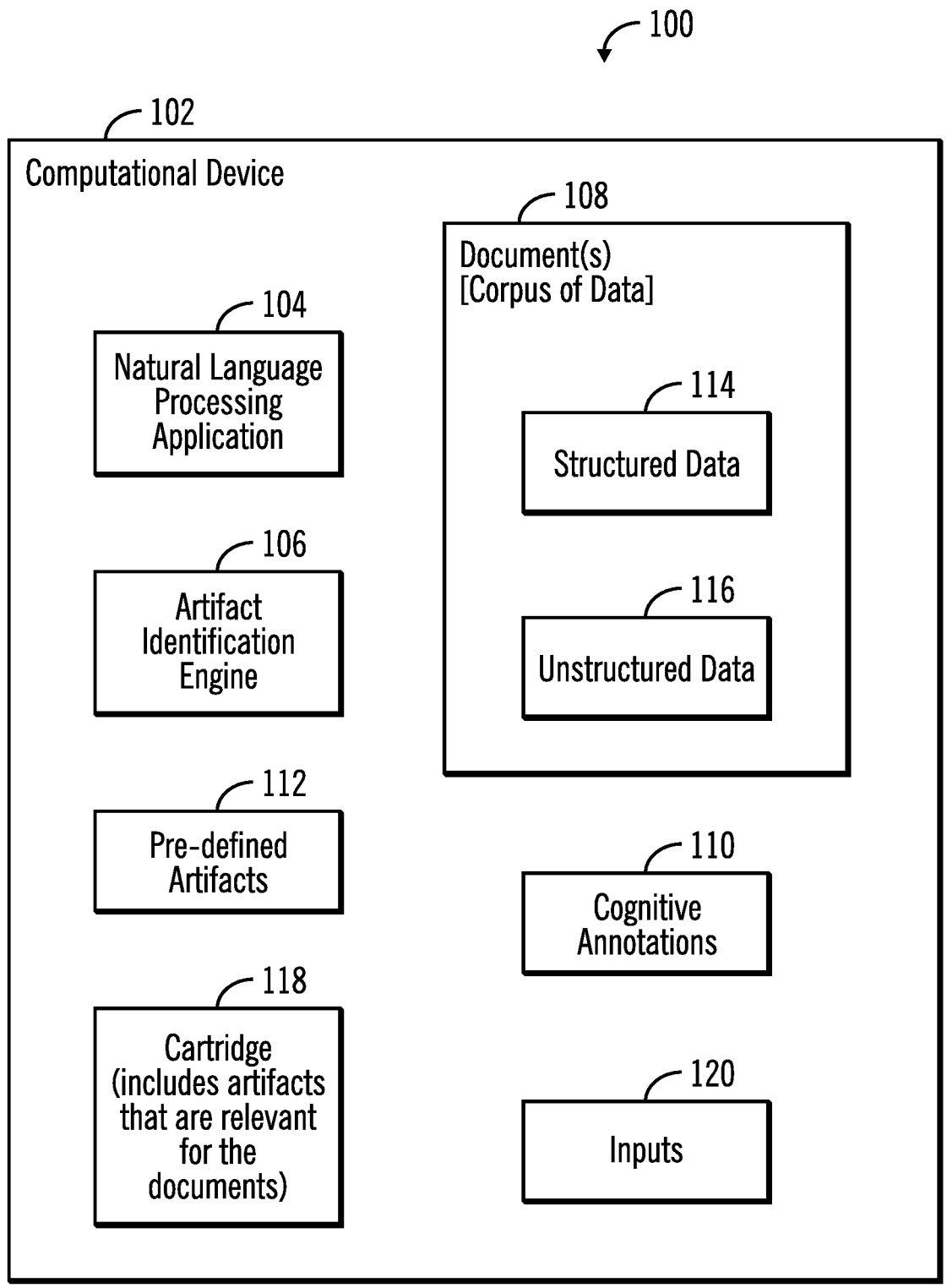
FIG. 1 illustrates a block diagram of a computing environment comprising a computational device for generating a natural language processing cartridge, in accordance with certain embodiments.

FIG. 1 illustrates a block diagram of a computing environment 100 comprising a computational device 102 for generating a natural language processing cartridge, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, etc. The computational device 102 may be an element in in any suitable network, such as, a storage area network, a wide area network, the Internet, an intranet, etc. In certain embodiments, the computational device 102 may be a node in a cloud computing environment that comprises the computing environment 100.

The computational device 102 includes a natural language processing application 104 and an artifact identification engine 106. In certain embodiments, the natural language processing application and the artifact identification engine are implemented in software, firmware, hardware or any combination thereof.

The natural language processing application 104 may process textual data maintained in one or more documents 108 generated in a variety of natural languages, such as English, French, Japanese, etc., and generate cognitive annotations 110 from pre-defined artifacts 112. The textual data maintained in the documents 108 may include both structured data 114 and unstructured data 116. Structured data 114 comprises information, usually text files, displayed in titled columns and rows or other data structures. Structured data may be ordered and processed by data mining tools relatively easily. Unstructured data 116 is any other type of data and has no clear easily identifiable internal structure and many comprise a textual description.

The artifact identification engine 106 generates a cartridge 118 that may comprise a subset or a variation of the pre-defined artifacts 112 based on outputs of the natural language processing application 104 and the artifact identification engine 106 and various inputs 120 received by the computational device 102 or stored in the computational device 102. A cognitive model of the documents 108 may be generated from the cartridge 118.

Figure 2:
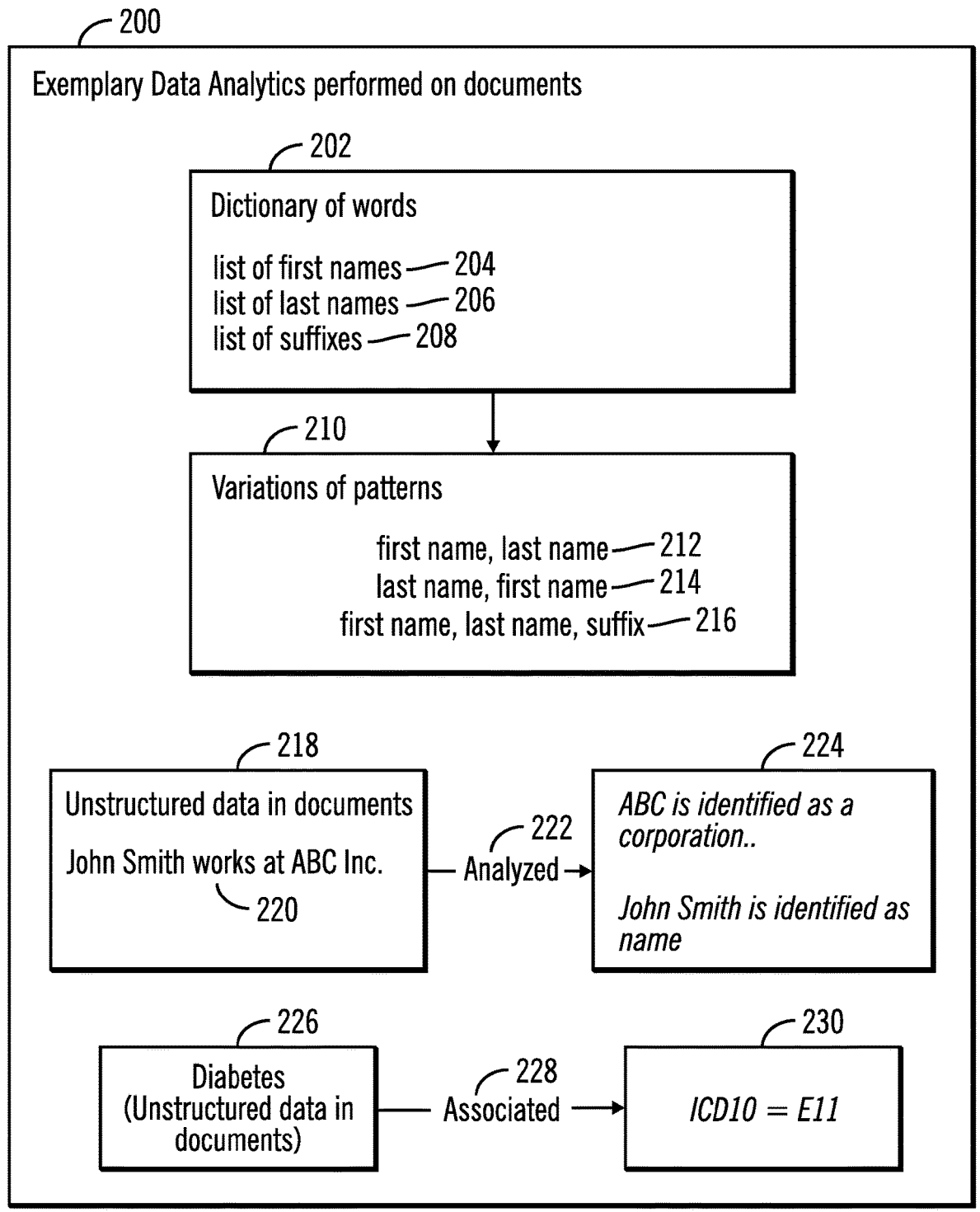
FIG. 2 illustrates a block diagram that shows exemplary data analytics performed on one or more documents, in accordance with certain embodiments.

FIG. 2 illustrates a block diagram 200 that shows how exemplary data analytics is performed on documents, in accordance with certain embodiments.

In certain embodiments, a dictionary of words 202 comprising a list of first names 204 (e.g., John, Jane, etc.), a list of last names 206 (e.g., Smith, Brown, etc.), and list of suffixes 208 (e.g., II, III, Jr., etc.) may be maintained. A variation of patterns 210 of the usage of names may also be maintained. Exemplary variations of name appearing in documents may include first name followed by last name (reference numeral 212), last name followed by first name (reference numeral 214) or first name followed by last name followed by suffix (reference numeral 216). Additional dictionaries and patterns may be maintained for names of corporations etc.

An unstructured data in documents may include the statement "John Smith works at ABC Inc." (as shown via reference numerals 218, 220). The natural language processing application 104 may analyze (reference numeral 222) the unstructured data (reference numerals 218, 220) based on dictionaries and patterns to identify ABC as a corporation and John Smith as a name (as shown via reference numeral 224).

In another embodiment, the natural language processing application 104 may analyze the word "diabetes" in unstructured data and associate the ICD-10 medical classification list with E11 which is a medical identification code with the word "diabetes" (as shown via reference numerals 226, 228, 230) [ICD-10 is the 10th revision of the International Statistical Classification of Diseases and Related Health Problems (ICD), a medical classification list by the World Health Organization (WHO) and contains codes for diseases, signs and symptoms, abnormal findings, complaints, social circumstances, and external causes of injury or diseases].

For performing the operations shown in FIG. 2 the computational device 102 maintains pre-defined artifacts 112 that are included in the dictionaries 202 and that are used for the patterns 210. The pre-defined artifacts 112 may have been generated from a corpus of previously used data in a variety of domains. For example, pre-defined artifacts may have been built based on health related documents, finance related documents, etc.

Figure 3:
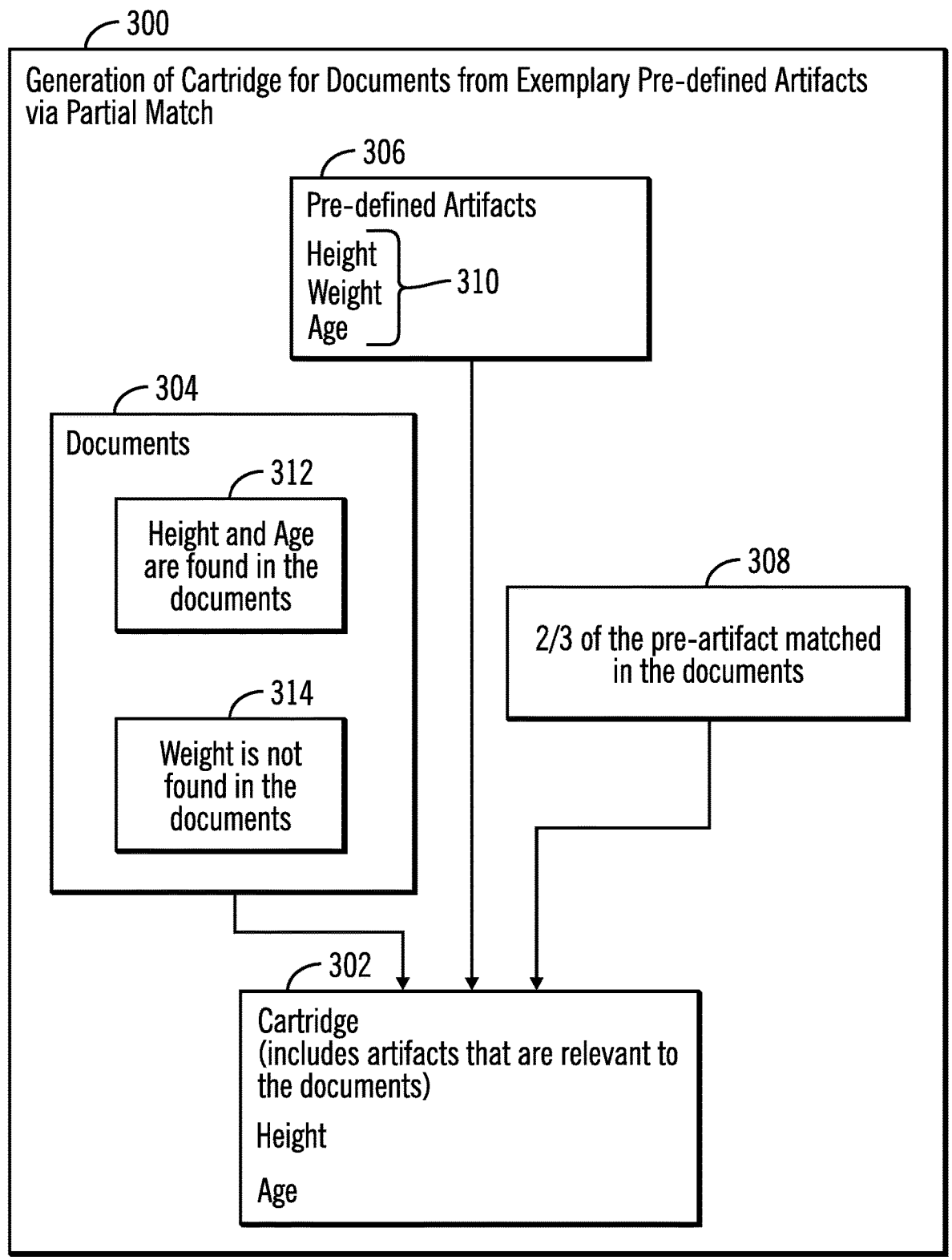
FIG. 3 illustrates a block diagram that shows generation of a cartridge for documents from pre-defined artifacts via partial match of entities, in accordance with certain embodiments.

FIG. 3 illustrates a block diagram 300 that shows generation of a cartridge 302 for documents 304 from exemplary pre-defined artifacts 306 via partial match of entities 308, in accordance with certain embodiments.

Exemplary pre-defined artifacts 306 includes entities 310 corresponding to height, weight, and age. Height and age may be found in documents 304 more than a threshold number of times, while weight may not be found (or appears less than a threshold number of times) in the documents (as shown via reference numerals 312, 314). Thus ⅔ of entities in the pre-defined artifact matches in the documents (as shown via reference numeral 308). In certain embodiments, the partial match (e.g., at least ⅔ of the entities matched) of the pre-defined artifact 306 may be adequate to include just the height and age (and exclude the weight) in the cartridge 302 that is generated for the documents 304 by the artifact identification engine 106.

Therefore, FIG. 3 shows an embodiment in which a cartridge 302 is generated for documents based on pre-defined artifacts 306. A cognitive model of the documents 304 may be generated from the cartridge 302.

Figure 4:
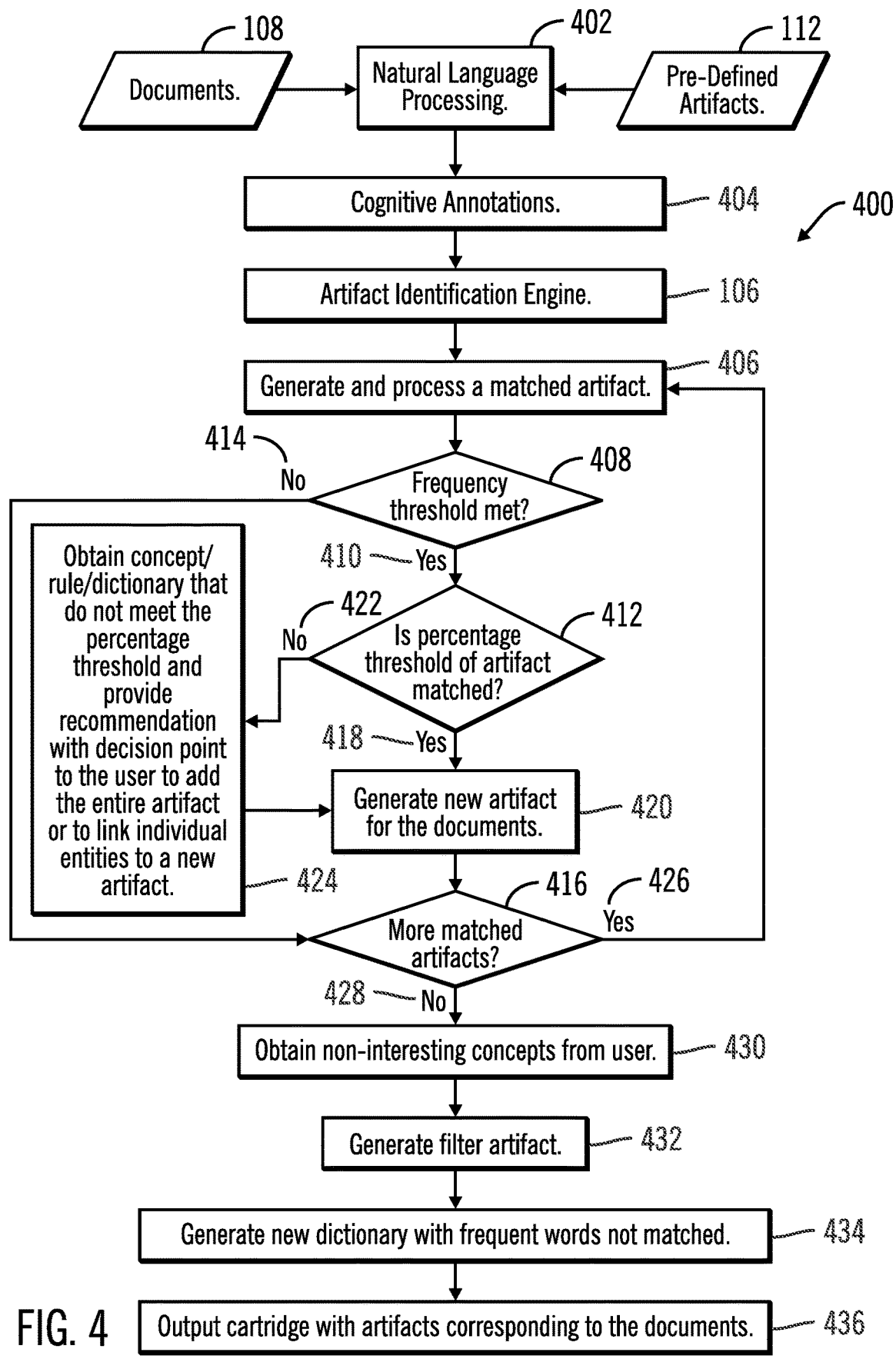
FIG. 4 illustrates a first flowchart for generating a natural language processing cartridge, in accordance with certain embodiments.

FIG. 4 illustrates a first flowchart 400 for generating a natural language processing cartridge, in accordance with certain embodiments. The operations shown in FIG. 4 may be performed by the natural language processing application 104 and the artifact identification engine 106 that executes in the computational device 102.

Control starts at block 402, where the natural language processing application 104 performs natural language processing (rules based or machine learning based) on the documents 108 utilizing the pre-defined artifacts 112. The pre-defined artifacts 112 may be in a catalog of a domain expert systems tool. The natural language processing generates cognitive annotations (at block 404), where the cognitive annotations may include concepts, attributes, relationships, rules, etc.

The artifact identification engine 106 identifies artifacts in the pre-defined artifacts 112 that were utilized (i.e., matched) to generate the cognitive annotations and generates and processes a matched artifact (at block 406).

If the artifact's entities meet or exceeds a defined frequency threshold (e.g., the entities are used more than a threshold number of times) ["Yes" branch 410 from block 408] then control proceeds to block 412. Otherwise ("No" branch 414), control proceeds to block 416.

At block 412 if the number of identified entities matched within the artifact meets or exceed a predetermined percentage (or fractional) threshold ("Yes" branch 418), then control proceeds to block 420 where a new artifact is generated for the document. The new artifact may be the entirety of the artifact that matched or part of the artifact. Otherwise ("No" branch 422) control proceeds to block 424.

At block 424 the artifact identification engine 106 obtains concepts, rules, or dictionaries that do not meet the percentage threshold, and provides a recommendation with decision points to a user to add the entire artifact or to link individual entities to a new artifact and control proceeds to block 420 which shows the new artifact being generated for the documents.

From block 420 control proceeds to block 416, in which a determination is made as to whether there are more matched artifacts. If so ("Yes" branch 426) control proceeds to block 406 of processing of the additional matched artifacts. If not ("No" branch 428) control proceeds to block 430 in which the artifact identification engine 106 obtains terms from the user that are not interesting to them for their model use case, and then at block 432 generates a filter artifact based on the concepts identified as not interesting. This new filter is added to the artifact. Using the identified words from within the documents that are not found as a cognitive annotation, the artifact identification engine 106 generates a list of unmatched concepts. These unmatched concepts are used to generate a new dictionary artifact (at block 434). This dictionary is added to the cartridge.

The artifact identification engine 106 outputs the generated cartridge that contains artifacts relevant to documents (at block 436). This cartridge serves as a start point for the user who is building the cognitive model for the documents.

Figure 5:
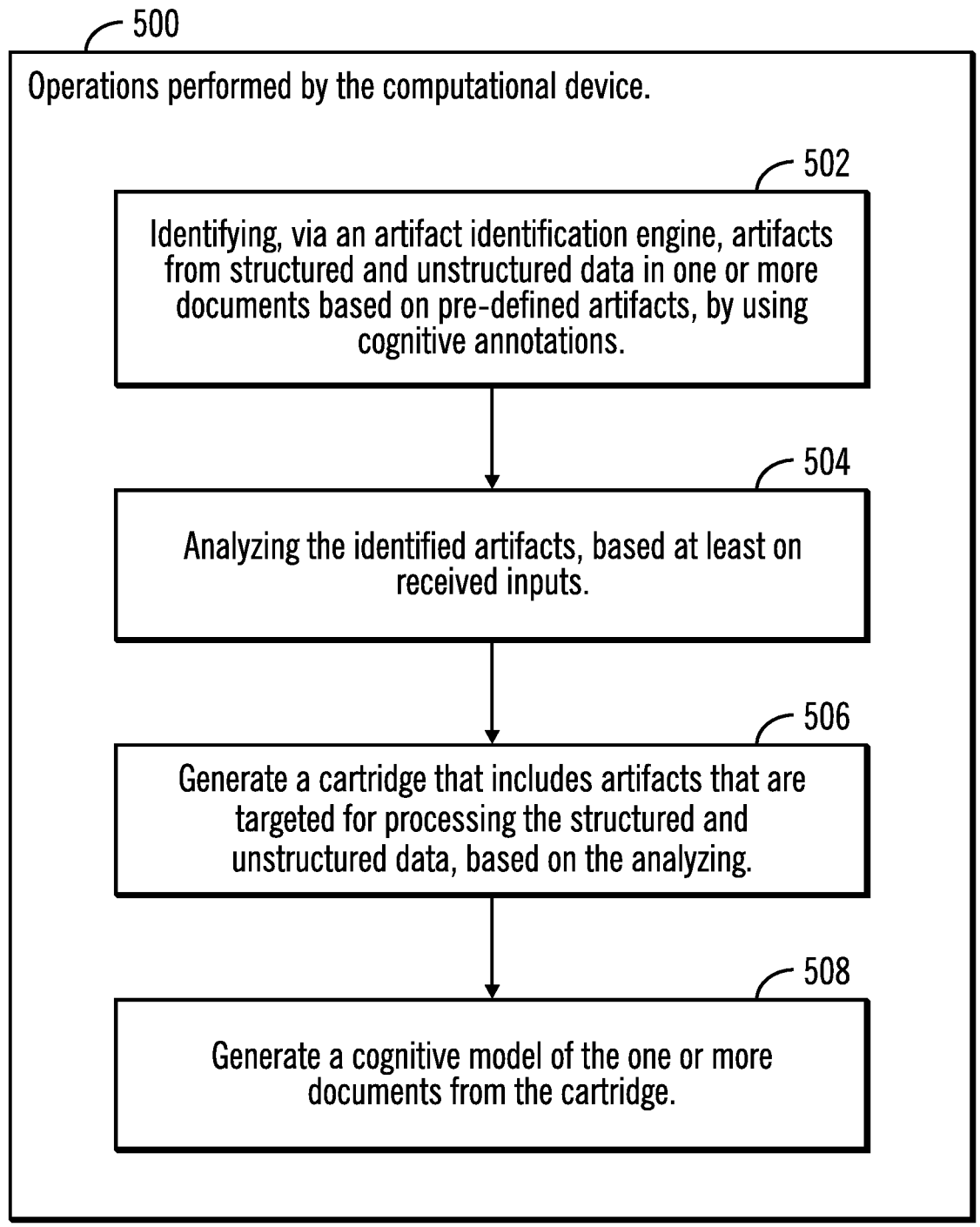
FIG. 5 illustrates a second flowchart for generating a natural language processing cartridge, in accordance with certain embodiments.

FIG. 5 illustrates a second flowchart 500 for generating a natural language processing cartridge, in accordance with certain embodiments. The operations shown in FIG. 5 may be performed by the natural language processing application 104 and the artifact identification engine 106 that executes in the computational device 102.

Control starts at block 502 in which an artifact identification engine 106 identifies artifacts from structured and unstructured data 114, 116 in one or more documents 108 based on pre-defined artifacts 112, by using cognitive annotations 110. The identified artifacts are analyzed (at block 504) based at least on received inputs. The identified artifacts exceed a frequency threshold of occurrence in the one or more documents and the received inputs may include a predetermined threshold (e.g., ⅔ or 67%) in matching for entities within an artifact, wherein if entities within an identified artifact exceed the predetermined threshold in matching, then the identified artifact is added to the cartridge, and wherein if entities within the identified artifact do not exceed the predetermined threshold in matching, then a subset of the entities of the identified artifact is added to the cartridge. The received inputs may also include information that is used to generate filter artifacts based on concepts that are identified as not interesting in the received inputs.

A cartridge 118 that includes artifacts that are targeted for processing the structured and unstructured data is generated (at block 506), based on the analyzing, where the artifacts that are targeted for processing the structured and unstructured data are artifacts that are relevant to the structured and unstructured data. The relevancy of artifacts for the structured and unstructured data is determined based on a plurality of conditions that have been described earlier in FIG. 4. For example, one condition that may cause the inclusion of the artifact in the cartridge may be that the artifact exceeds a frequency threshold of occurrence in the one or more documents that include the structured and unstructured data, as this may establish that the artifact is relevant to the structured and unstructured data. Another condition for determining relevancy for inclusion of an artifact in the cartridge may be based on determining whether the received inputs include a predetermined threshold in matching for entities within an artifact, and if entities within the artifact exceed the predetermined threshold in matching, then the artifact may be added to the cartridge, whereas if entities within the artifact do not exceed the predetermined threshold in matching, then a subset of the entities of the artifact may be added to the cartridge. Additional conditions for inclusion of artifacts in a cartridge have also been described in FIG. 4. Additionally, FIG. 3 (block 302) provides an example that shows the relevancy of an artifact for a document based at least on partial matching of entities of a pre-defined artifact.

From block 506 control proceeds to block 508 in which a cognitive model of the documents is generated from the cartridge 118.

Therefore, FIGS. 1-5 illustrates certain embodiments in which a cartridge is generated from pre-defined artifacts for generating cognitive models of one or more documents.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
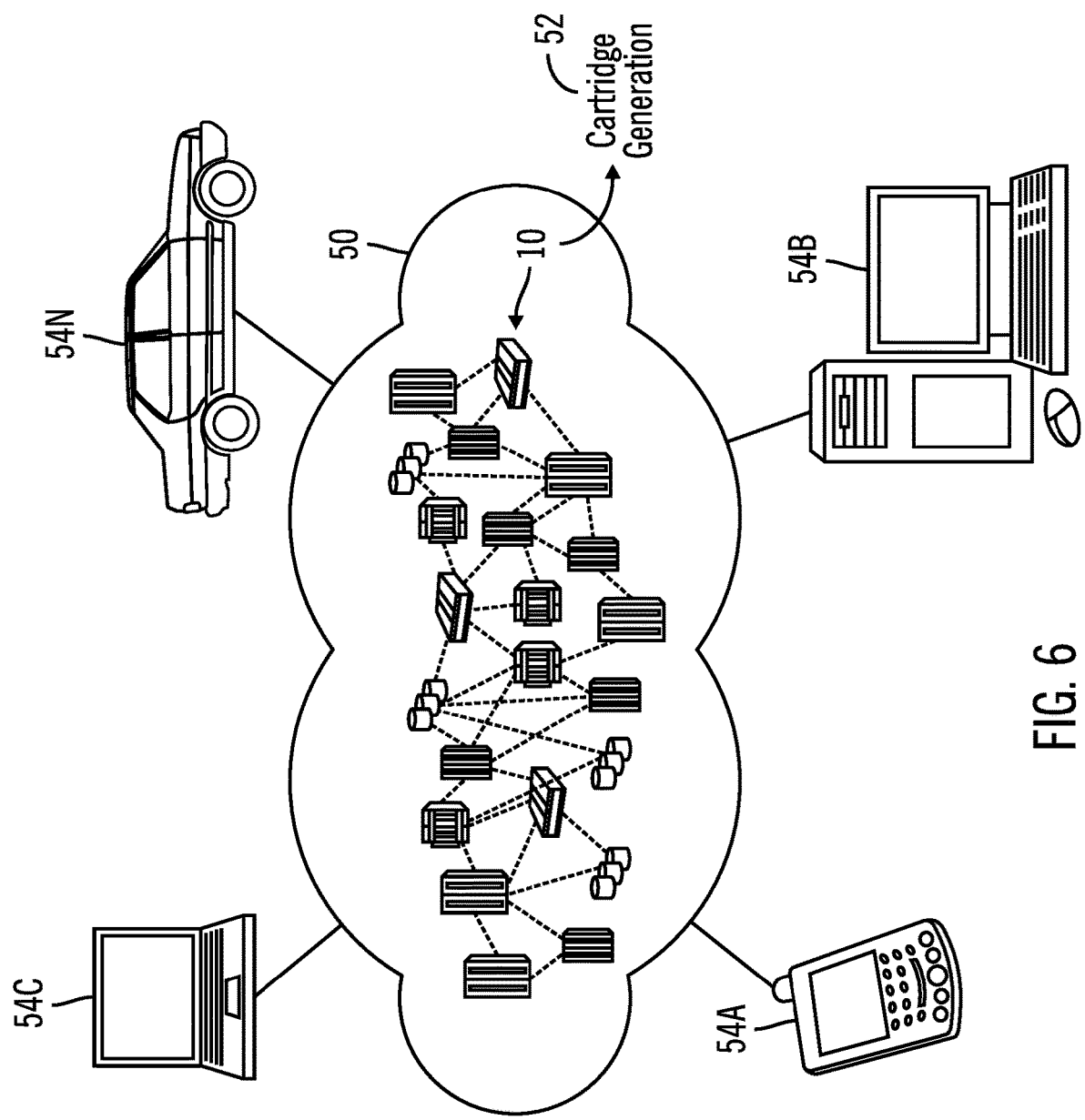
FIG. 6 illustrates a block diagram of a cloud computing environment, in accordance with certain embodiments.

Referring now to FIG. 6 an illustrative cloud computing environment 50 is depicted. Cartridge generation (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
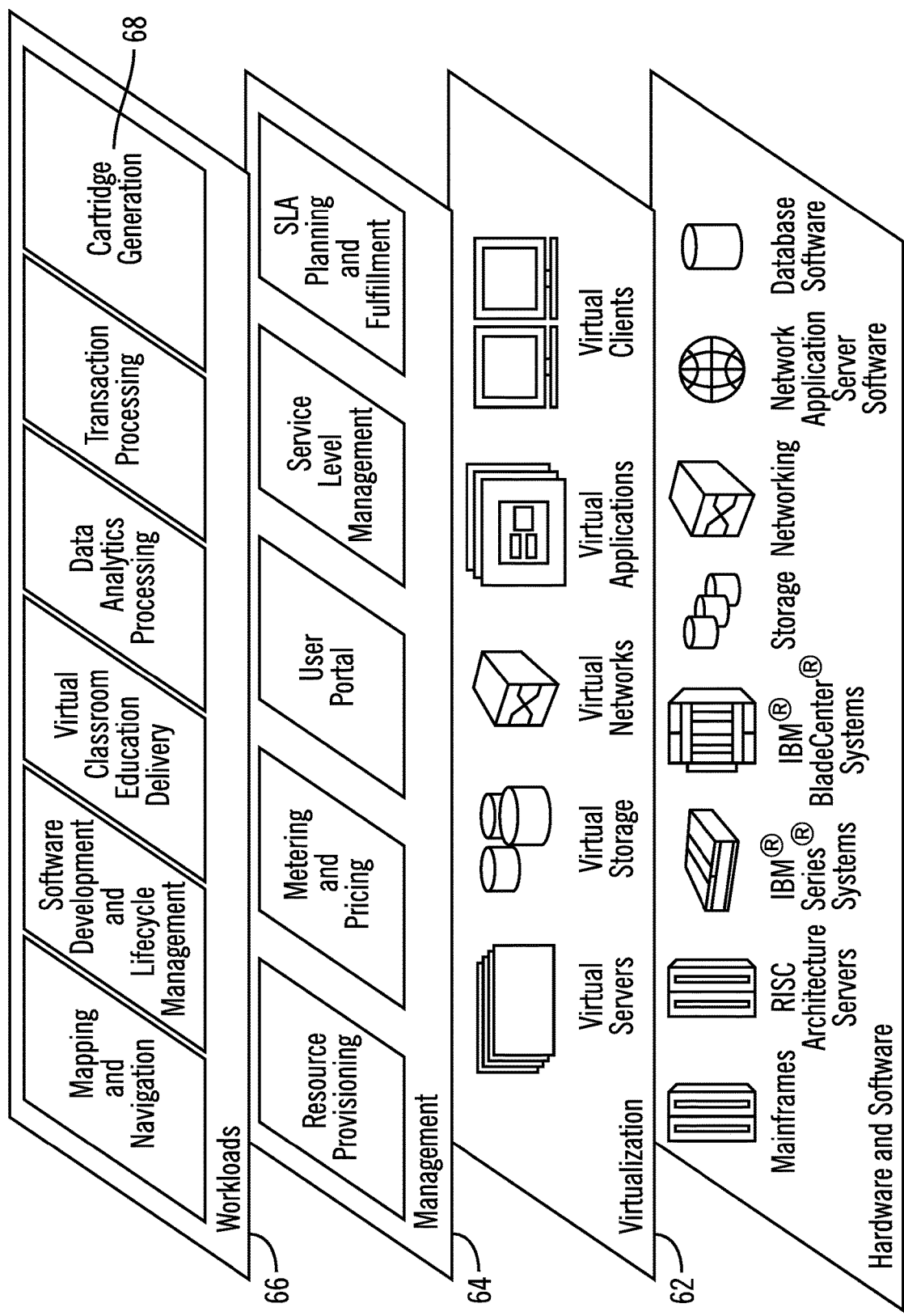
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

* IBM, ZSERIES, PSERIES, XSERIES, BLADECENTER, WEBSPHERE, DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cartridge generation 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
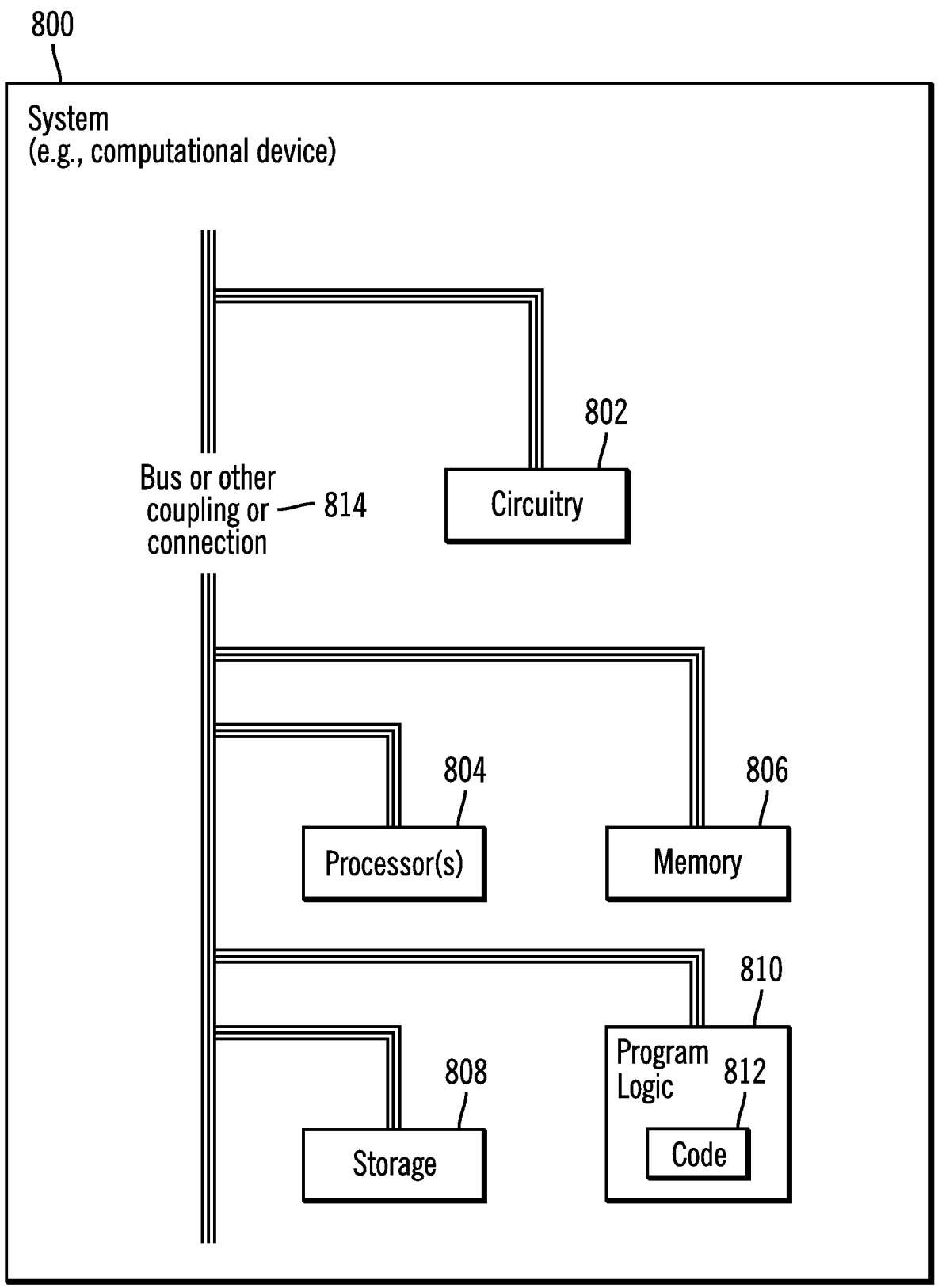
FIG. 8 illustrates a block diagram of a computational system that shows certain elements that may be included in the computational device, as described in FIGS. 1-7, in accordance with certain embodiments.

FIG. 8 illustrates a block diagram that shows certain elements that may be included in the computational device 102, in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. While FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
identifying, via an artifact identification engine, artifacts from structured and unstructured data in one or more documents based on pre-defined artifacts, by using cognitive annotations; and
analyzing the identified artifacts, based at least on received inputs; and
generating a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact exceed the predetermined threshold in matching, then the identified artifact is added to the cartridge, and wherein the cartridge generates a cognitive model for the one or more documents.

2. The method of claim 1, wherein the received inputs are used to generate filter artifacts based on concepts that are identified as not interesting in the received inputs.

3. The method of claim 1, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

4. A method, comprising:
identifying, via an artifact identification engine, artifacts from structured and unstructured data in one or more documents based on pre-defined artifacts, by using cognitive annotations; and
analyzing the identified artifacts, based at least on received inputs; and
generating a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact do not exceed the predetermined threshold in matching, then a subset of the entities of the identified artifact is added to the cartridge, and wherein the cartridge generates a cognitive model for the one or more documents.

5. The method of claim 4, wherein the cognitive annotations are generated via a natural language processing software that process the structured and unstructured data in the one or more documents based on the pre-defined artifacts.

6. The method of claim 4, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

7. A system, comprising:
a memory; and
a processor coupled to the memory, wherein the processor performs operations, the operations comprising:
identifying, via an artifact identification engine, artifacts from structured and unstructured data in one or more documents based on pre-defined artifacts, by using cognitive annotations; and
analyzing the identified artifacts, based at least on received inputs; and
generate a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact exceed the predetermined threshold in matching, then the identified artifact is added to the cartridge, and wherein the cartridge generates a cognitive model for the one or more documents.

8. The system of claim 7, wherein the received inputs are used to generate filter artifacts based on concepts that are identified as not interesting in the received inputs.

9. The system of claim 8, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

10. The system of claim 7, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

11. A system, comprising:
a memory; and
a processor coupled to the memory, wherein the processor performs operations, the operations comprising:
identifying, via an artifact identification engine, artifacts from structured and unstructured data in one or more documents based on pre-defined artifacts, by using cognitive annotations; and
analyzing the identified artifacts, based at least on received inputs; and
generating a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact do not exceed the predetermined threshold in matching, then a subset of the entities of the identified artifact is added to the cartridge, and wherein the cartridge generates a cognitive model for the one or more documents.

12. The system of claim 11, wherein the cognitive annotations are generated via a natural language processing software that process the structured and unstructured data in the one or more documents based on the pre-defined artifacts.

13. A computer program product, the computer program product comprising a computer readable storage medium having computer readable program code embodied therewith, the computer readable program code configured to perform operations, the operations comprising:
  identifying, via an artifact identification engine, artifacts from structured and unstructured data in one or more documents based on pre-defined artifacts, by using cognitive annotations; and
  analyzing the identified artifacts, based at least on received inputs; and
  generate a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact exceed the predetermined threshold in matching, then the identified artifact is added to the cartridge, and wherein the cartridge generates a cognitive model for the one or more documents.

14. The computer program product of claim 13, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

15. The computer program product of claim 14, wherein the cognitive annotations are generated via a natural language processing software that process the structured and unstructured data in the one or more documents based on the pre-defined artifacts.

16. The computer program product of claim 14, wherein the received inputs are used to generate filter artifacts based on concepts that are identified as not interesting in the received inputs, and wherein the cognitive annotations are generated via a natural language processing software that process the structured and unstructured data in the one or more documents based on the pre-defined artifacts.

17. The computer program product of claim 13, wherein the received inputs are used to generate filter artifacts based on concepts that are identified as not interesting in the received inputs.

18. A computer program product, the computer program product comprising a computer readable storage medium having computer readable program code embodied therewith, the computer readable program code configured to perform operations, the operations comprising:
  identifying, via an artifact identification engine, artifacts from structured and unstructured data in one or more documents based on pre-defined artifacts, by using cognitive annotations; and
  analyzing the identified artifacts, based at least on received inputs; and
  generate a cartridge that includes artifacts that are targeted for processing the structured and unstructured data, based on the analyzing, wherein the identified artifacts exceed a frequency threshold of occurrence in the one or more documents, wherein the received inputs include a predetermined threshold in matching for entities within an artifact, wherein if entities within an identified artifact do not exceed the predetermined threshold in matching, then a subset of the entities of the identified artifact is added to the cartridge, and wherein the cartridge generates a cognitive model for the one or more documents.

\* \* \* \* \*